United States Patent
Blaho

(10) Patent No.: US 6,864,889 B2
(45) Date of Patent: Mar. 8, 2005

(54) SYSTEM FOR PREVIEWING A PHOTOREALISTIC RENDERING OF A SYNTHETIC SCENE IN REAL-TIME

(75) Inventor: Bruce E Blaho, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 09/999,685

(22) Filed: Oct. 31, 2001

(65) Prior Publication Data

US 2003/0080966 A1 May 1, 2003

(51) Int. Cl.[7] ............................................... G06T 15/00
(52) U.S. Cl. ..................... 345/426; 345/422; 345/428; 345/501; 345/552
(58) Field of Search .......................... 345/582–587, 345/423, 426–428, 418–425, 619, 633, 501–503, 506, 530, 539, 541, 545, 552, 48, 84; 348/24–25, 130, 135, 142

(56) References Cited

U.S. PATENT DOCUMENTS

| | | | | |
|---|---|---|---|---|
| 6,028,608 A | * | 2/2000 | Jenkins | 345/619 |
| 6,057,847 A | * | 5/2000 | Jenkins | 345/422 |
| 6,115,053 A | * | 9/2000 | Perlin | 345/475 |
| 6,160,907 A | * | 12/2000 | Robotham et al. | 382/154 |
| 6,297,834 B1 | * | 10/2001 | Malzbender | 345/586 |
| 6,515,674 B1 | * | 2/2003 | Gelb et al. | 345/582 |
| 6,570,578 B1 | * | 5/2003 | Smirnov et al. | 345/629 |
| 6,633,304 B2 | * | 10/2003 | Anabuki et al. | 345/663 |

OTHER PUBLICATIONS

Paul Debevec, "Rendering Synthetic Objects into Real Scenes", SIGGRAPH 98, Jul. 1998.*

* cited by examiner

Primary Examiner—Lee M. Tung
Assistant Examiner—Wesner Sajous

(57) ABSTRACT

A system is provided for previewing a photorealistic representation of a synthetic scene in real-time. An object may be sampled in accordance with predetermined parameters to generate a predetermined number of base images. Direction-dependent textures maps are generated based upon the base images. The synthetic scene is rendered based upon the texture maps and output for display in real-time on a display device.

24 Claims, 8 Drawing Sheets

SYSTEM FOR PREVIEWING A PHOTOREALISTIC RENDERING OF A SYNTHETIC SCENE IN REAL-TIME

CROSS-REFERENCE TO RELATED APPLICATIONS

This application is related to co-pending U.S. utility patent application entitled "SYSTEM FOR GENERATING A SYNTHETIC SCENE", filed concurrent herewith, which is hereby entirely incorporated by reference.

FIELD OF THE INVENTION

The present invention pertains to the field of computer graphics systems. More particularly, this invention relates to a computer graphics system and method of rendering a scene based upon synthetically generated texture maps.

BACKGROUND OF THE INVENTION

A typical computer graphics system includes a display device having a two-dimensional (2D) array of light emitting areas. The light emitting areas are usually referred to as pixels. Such a computer graphics system typically implements hardware and/or software for generating a 2D array of color values that determine the colors that are to be emitted from the corresponding pixels of the display device.

Such computer graphics systems are commonly employed for the display of three-dimensional (3D) objects. Typically, such a computer graphics system generates what appears to be a 3D object on a two dimensional (2D) display device by generating 2D views of the 3D object. The 2D view of a 3D object which is generated at a particular time usually depends on a spatial relationship between the 3D object and a viewer of the 3D object at the particular time. This spatial relationship may be referred to as the view direction.

U.S. utility application entitled, "DIRECTION-DEPENDENT TEXTURE MAPS IN A GRAPHICS SYSTEM" having Ser. No. 09/329553 filed Jun. 10, 1999 discloses a method for generating texture maps in a graphics system, and is hereby incorporated by reference. The process by which a computer graphics system generates the color values for a 2D view of a 3D object is commonly referred to as image rendering. A computer graphics system usually renders a 3D object by subdividing the 3D object into a set of polygons and rendering each of the polygons individually.

The color values for a polygon that are rendered for a particular view direction usually depend on the surface features of the polygon and the effects of lighting on the polygon. The surface features include features such as surface colors and surface structures. The effects of lighting usually depend on a spatial relationship between the polygon and one or more light sources. This spatial relationship may be referred to as the light source direction.

Typically, the evaluation of the effects of lighting on an individual pixel in a polygon for a particular view direction involves a number of 3D vector calculations. These calculations usually include floating-point square root and divide operations. Such calculations are usually time consuming and expensive whether performed in hardware or software.

One prior method for reducing such computation overhead is to evaluate the effects of lighting at just a few areas of a polygon, such as the vertices, and then interpolate the results across the entire polygon. Examples of these methods include methods that are commonly referred to as flat shading and smooth shading. Such methods usually reduce the number of calculations that are performed during scan conversion and thereby increase rendering speed. Unfortunately, such methods also usually fail to render shading features that are smaller than the areas of individual polygons.

One prior method for rendering features that are smaller than the area of a polygon is to employ what is commonly referred to as a texture map. A typical texture map is a table that contains a pattern of color values for a particular surface feature. For example, a wood grain surface feature may be rendered using a texture map that holds a color pattern for wood grain.

Unfortunately, texture mapping usually yields relatively flat surface features that do not change with the view direction or light source direction. The appearance of real 3D objects, on the other hand, commonly do change with the view direction and/or light source direction. These directional changes are commonly caused by 3D structures on the surface of a polygon. Such structures can cause localized shading or occlusions or changes in specular reflections from a light source. The effects can vary with view direction for a given light source direction and can vary with light source direction for a given view direction.

One prior method for handling the directional dependence of such structural effects in a polygon surface is to employ what is commonly referred to as a bump map. A typical bump map contains a height field from which a pattern of 3D normal vectors for a surface is extracted. The normal vectors are usually used to evaluate lighting equations at each pixel in the surface. Unfortunately, such evaluations typically involve a number of expensive and time-consuming 3D vector calculations, thereby decreasing rendering speed or increasing graphics system hardware and/or software costs.

In applications such as 3D computer-generated animations, a scene is composed of multiple sequential frames of imagery. During the process of creating a computer-generated graphics presentation, such as, for example, in animations or movies, a sequence of scenes depicting various environments and objects is created and sequentially assembled to form a complete presentation which is displayed to a user via a display device on a sequential basis scene by scene.

Each scene may be composed of a sequence of frames. A frame is typically a 2D static representation of a 3D or 2D object within a defined environment.

Each frame may present a 3D or 2D object or objects from a particular viewing (camera) angle or as illuminated from a particular lighting angle. From frame to frame of the scene, such things as camera angle or lighting angle may change thereby giving the scene a dynamic feel through a sense of motion or change. For example, an object may be viewed in one frame from a head-on viewing position while in a second sequential frame, the same object is viewed from a left side viewing position. When the two frames are viewed in sequence, the object appears to turn from a straight forward position to a position facing to the right-hand side of the object. The process of creating a scene involves assembling a series of images or frames. During this process, it is common for the creator/editor to preview the scene in order to determine progress or status of work done on the scene to that point.

With 3D objects where environments are represented in the scene, each frame will be rendered to add realism and 3D qualities such as shadows and variations in color or shade. In a computer graphics system, this rendering process is computationally intensive and can take significant time to complete, depending on the level of 3D quality desired for the preview, scene display and/or the power of the computer hardware used to carry out the rendering computations. As a result, it is common for creators/authors to opt for a lower level of detail in 3D quality when carrying out a preview of a scene. Some examples of lower level scene quality include wire frame presentations or low-resolution texture mapping. While this does allow the creator/author to preview a general representation of the scene in less time, it falls far short of providing a preview of a true representation of the scene as it will appear in final form.

In order to provide a realistic appearance to the scene and objects therein, texture mapping techniques are used to provide such things as shadow, highlights and surface texture to the objects and scene surfaces through the process of rendering.

Techniques have been proposed for generating an image based texture map in which a scene and/or an object within a scene are photographed for multiple pre-defined camera positions via, for example, a digital or film-based still camera. A variation on this technique holds the camera position constant while a light/illumination source is moved so as to illuminate the object from different angles thereby casting different shadows and highlights on the object. While this technique is useful, it is quite time consuming to generate a series of images for use in generating an image-based texture map, and of course requires the actual physical object or a model of it.

Typically, at some point during the process of creating a computer-generated scene, the user (creator) wants to view the scene to determine if it is as desired. To do so in a manner that presents a photorealistic appearance to the scene, each frame is typically rendered in accordance with a predefined texture map. As the process of rendering a scene can require considerable time to carry out due to the computational complexities of rendering the scene, it is common for users to select a lower level of scene quality for representation during the "preview" of the scene.

Thus, a heretofore unaddressed need exists in the industry to address the aforementioned deficiencies and inadequacies.

SUMMARY OF THE INVENTION

The present invention provides a system and method for rendering a synthetic or computer-generated scene based on a predetermined set of base images. Briefly described, in architecture, the system can be implemented as follows. A storage memory is provided for storing a texture map generated in accordance with a predetermined number of base images; a rendering unit is provided for rendering a scene in accordance with the image based texture map and then outputting the rendered scene for display on a display device. A controller is provided for controlling the rendering unit.

A further embodiment of the invention may be described as follows. A base image generator is provided for sampling a scene and generating a plurality of base images. A texture map generator is provided for generating a texture map in accordance with the plurality of base images. A storage service is provided for storing the texture map; and a rendering unit is provided for rendering the scene in accordance with the texture map.

The present invention can also be viewed as providing a method for rendering a photo realistic scene. In this regard, the method can be broadly summarized by the following steps: a scene composed of a synthetic environment and a synthetic object is defined; a predetermined number of base images are generated in accordance with predefined scene parameters. A texture map is created based on the predetermined number of base images; and the scene is rendered in accordance with the texture map.

Additionally the present invention may be viewed as providing a method of generating photorealistic imagery that may be summarized by the following steps: a scene composed of a synthetic environment and a synthetic object is defined; a predetermined number of base images are generated in accordance with predefined scene parameters. Data representing the base images are stored to memory. Data representing the base images is retrieved from memory and a texture map is created based on the predetermined number of base images. The scene is rendered in accordance with the texture map and displayed for viewing.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
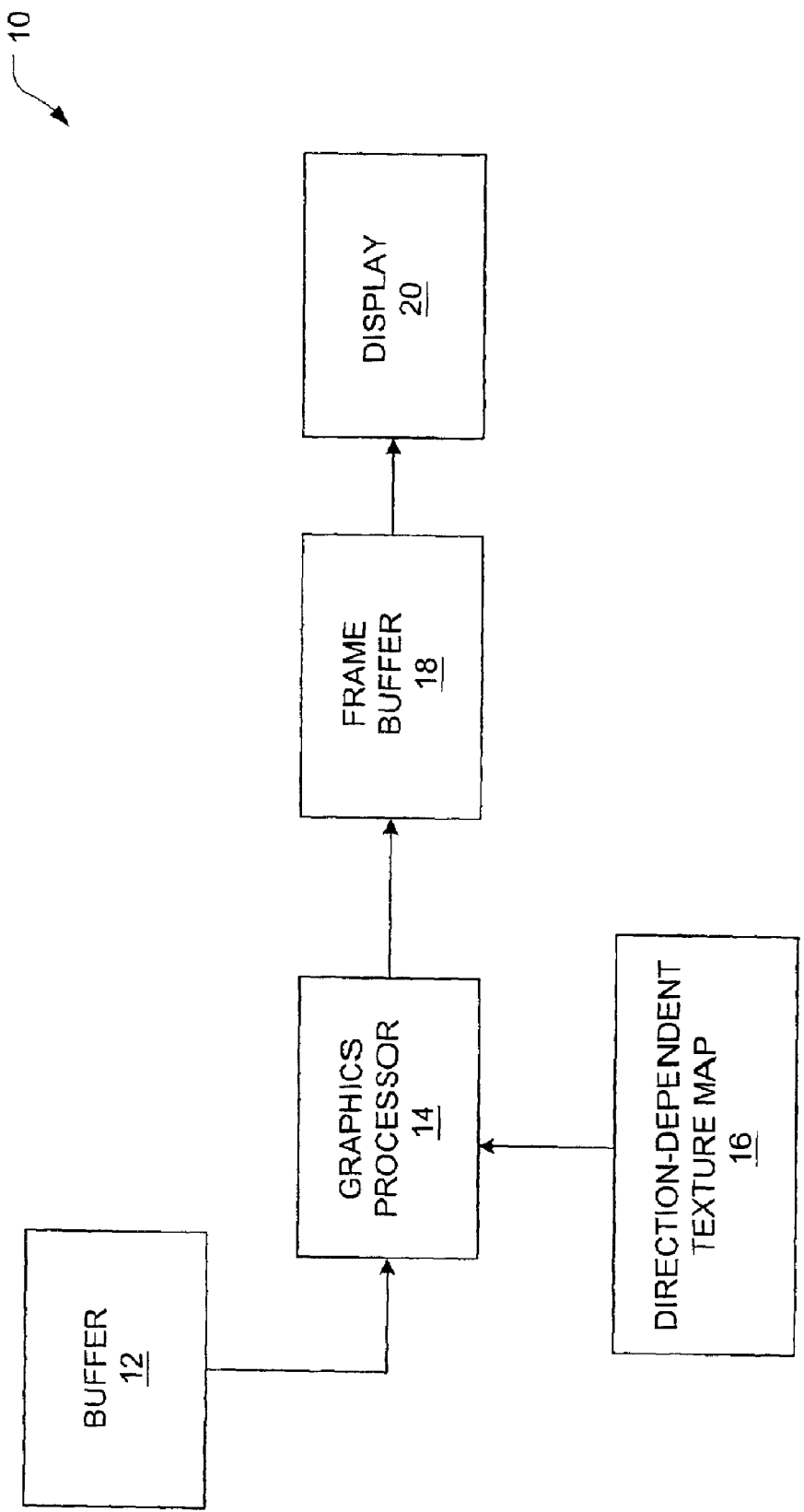
FIG. 1 shows a computer graphics system that renders surface features of 3D object using the present technique.

FIG. 1 shows a computer graphics system 10 that incorporates the teachings disclosed herein. The computer graphics system 10 includes a buffer 12, a graphics processor 14, a direction-dependent texture map 16, a frame buffer 18, and a display 20.

Figure 2:
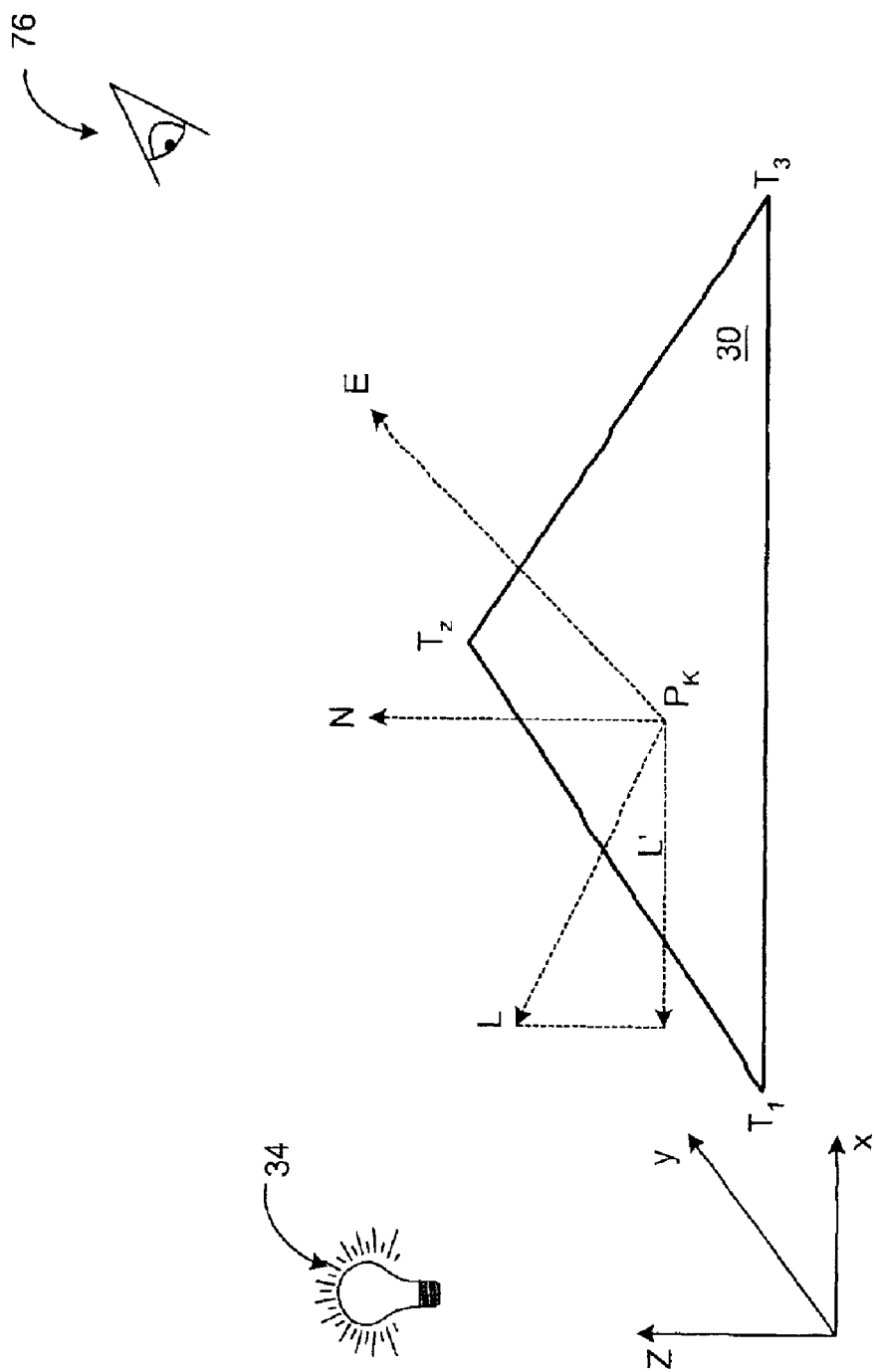
FIG. 2 shows a polygon which is defined in a buffer and which is to be rendered by the graphics processor using surface features defined by a direction-dependent texture map.

The buffer 12 holds geometry and attributes data that describes a 3D object which is to be generated on the display 20. The 3D object is represented in the buffer 12 as a set of polygons in a 3D space. In one embodiment, the polygons are triangles 30 (FIG. 2) and the geometry data in the buffer 12 includes the 3D coordinates of the vertices of the triangles.

The graphics processor 14 reads the geometry data that define the polygons from the buffer 12 and scan converts each polygon. The scan conversion of a polygon yields a 2D view of the polygon that depends on a view direction and a light source direction. A 2D view of a polygon includes a color value for each pixel of the polygon that is visible in the plane of the display 20. The graphics processor 14 writes the color values for the rendered polygons into the frame buffer 18. The color values from the frame buffer 18 are provided to the display 20. The display 20 is a 2D display device such as a raster scan device or flat-panel display device.

The direction-dependent texture map 16 holds parameters that define a surface structure in a manner in which the appearance of the surface structure varies with either view direction or light source direction. The graphics processor 14 maps the surface structure defined in the direction-dependent texture map 16 onto the polygons obtained from the buffer 12 during scan conversion. The result is a more realistic rendering of 3D features in a surface on a 3D object in comparison to texture mapping but without the computational penalties associated with bump mapping.

In an embodiment, the parameters contained in the direction-dependent texture map 16 are the A1, A2, A3, A4, A5, and A6 coefficients for evaluating the following second order polynomial equation (equation 1).

$$C_I = A1 D_u^2 + A2 D_v^2 + A3 D_u D_v + A4 D_u + A5 D_v + A6 \quad \text{(Equation 1)}$$

Where $C_I$ is the color intensity at a given point. The terms $D_u$ and $D_v$ are the 2D components of an eye point vector if the direction-dependent texture map 16 is adapted to view direction. The terms $D_u$ and $D_v$ are the 2D components of a light source vector if the direction-dependent texture map 16 is adapted to light source direction.

The following table (Table 1) illustrates the contents of the direction-dependent texture map 16. The direction-dependent texture map 16 contains n by m sub-map entries. Each of the n by m entries corresponds to a sample of a particular surface modeled by the direction-dependent texture map 16. These samples may be referred to as texels. The coefficients for an individual texel are denoted as $A1_{i,j} - A6_{i,j}$; wherein i ranges from 0–n and j ranges from 0–m.

TABLE 1

| | | | |
|---|---|---|---|
| $A1_{0,0}\ A2_{0,0}$ | $A1_{0,1}\ A2_{0,1}$ | ... | $A1_{0,m}\ A2_{0,m}$ |
| $A3_{0,0}\ A4_{0,0}$ | $A3_{0,1}\ A4_{0,1}$ | | $A3_{0,m}\ A4_{0,m}$ |
| $A5_{0,0}\ A6_{0,0}$ | $A5_{0,1}\ A6_{0,1}$ | | $A5_{0,m}\ A6_{0,m}$ |
| $A1_{1,0}\ A2_{1,0}$ | $A1_{1,1}\ A2_{1,1}$ | ... | $A1_{1,m}\ A2_{1,m}$ |
| $A3_{1,0}\ A4_{1,0}$ | $A3_{1,1}\ A4_{1,1}$ | | $A3_{1,m}\ A4_{1,m}$ |
| $A5_{1,0}\ A6_{1,0}$ | $A5_{1,1}\ A6_{1,1}$ | | $A5_{1,m}\ A6_{1,m}$ |
| . | . | . | . |
| . | . | . | . |
| . | . | . | . |
| $A1_{n,0}\ A2_{n,0}$ | $A1_{n,1}\ A2_{n,1}$ | ... | $A1_{n,m}\ A2_{n,m}$ |
| $A3_{n,0}\ A4_{n,0}$ | $A3_{n,1}\ A4_{n,1}$ | | $A3_{n,m}\ A4_{n,m}$ |
| $A5_{n,0}\ A6_{n,0}$ | $A5_{n,1}\ A6_{n,1}$ | | $A5_{n,m}\ A6_{n,m}$ |

The direction-dependent texture map 16 is representative of a set of texture maps that may be used for rendering 3D objects in the graphics system 10. Each direction-dependent texture map according to the present techniques is adapted to a particular surface structure that is to be mapped onto a 3D object.

In addition, each direction-dependent texture map is adapted to provide realistic 3D rendering in response to either light source direction or view direction. For example, the direction-dependent texture map 16 may be adapted to provide realistic 3D rendering in response to a varying light source direction for a given fixed view direction. Alternatively, the direction-dependent texture map 16 may be adapted to provide realistic 3D rendering in response to a varying view direction for a given fixed light source direction.

A direction-dependent texture map may be adapted to a particular color channel of the display 20. For example, the graphics system 10 may include a separate direction-dependent texture map for each of the red, green, and blue channels for an RGB display for a particular surface structure. Alternatively, a direction-dependent texture map may be used to model the luminance components for a particular surface structure and the corresponding chrominance components may be modeled as constants.

Previewing A Synthetic Scene in Real-time

High quality, computer based image synthesis tools which are found in many commercially available applications can be used to create multiple images of a synthetic scene instead of using actual photographs of a real scene. These applications can also generate synthetic scenes based on imagery and other input from a user. During the creation of a scene, progress of scene creation can be previewed to see how the scene appears. To make the preview as realistic as possible, it is preferable to use some level of texture mapping to render the scene for preview. However, as the level of photorealism desired during preview increases, the greater the time that is required for the available computational resources to render the scene for preview. In order to provide for increased photorealism during preview of a computer generated scene, and also to provide for real-time preview, one embodiment of the invention provides for generating a predetermined number of base images that are then used to generate direction-dependent texture maps in accordance with the base images. These direction-dependent texture maps are then used to render the scene.

Figure 3:
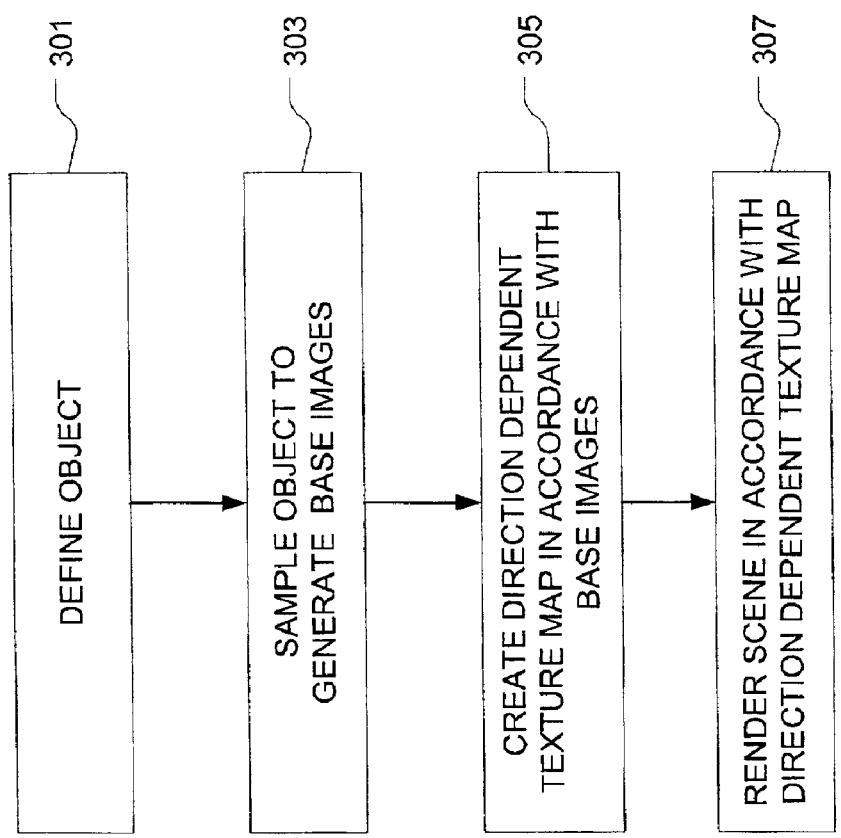
FIG. 3 is a flowchart illustrating the method of the present invention.
Figure 4B:
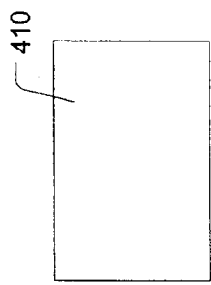
FIGS. 4A–4D are diagrams illustrating sampling of an object from different apparent perspectives to generate base images.
Figure 4C:
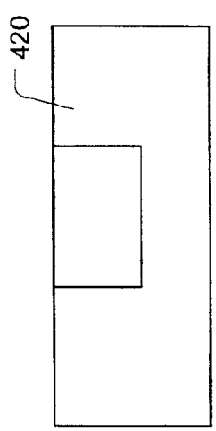
Figure 4D:
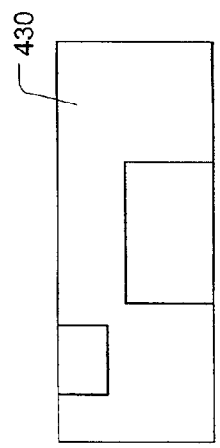
Figure 4A:
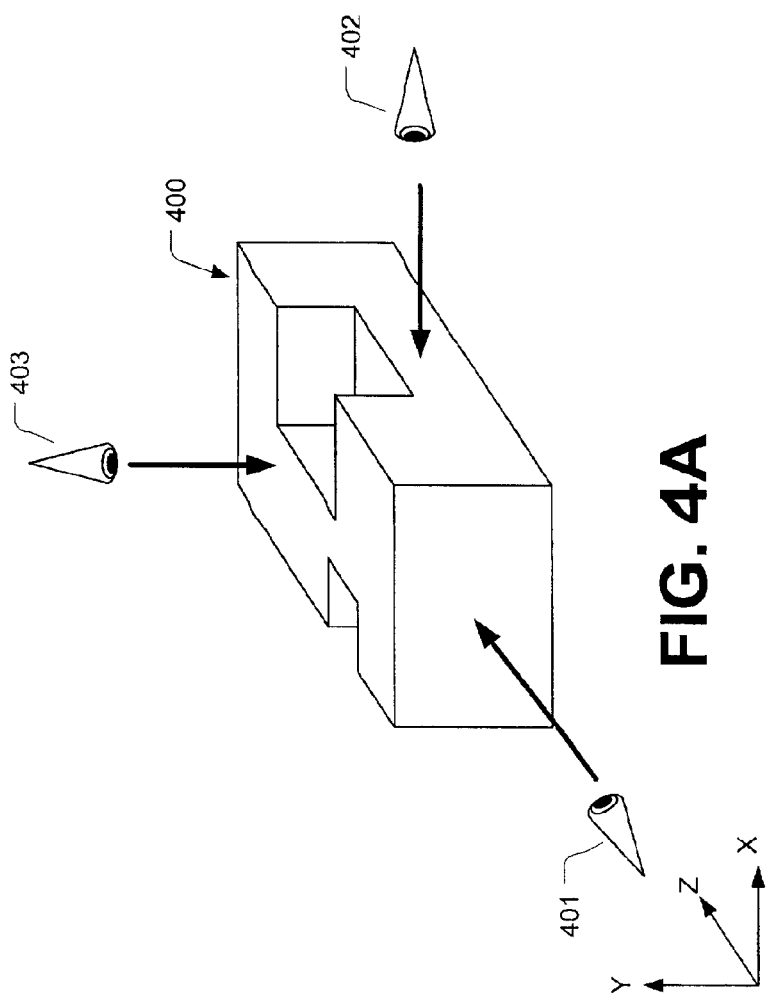

FIG. 3 illustrates a method of previewing a computer-generated, or synthetic scene using direction-dependent texture maps. These direction-dependent texture maps are generated in accordance with a predetermined set of base images.

The scene may include an environment and/or an object. In this method, an object which may be a part of the scene is defined, or created (301). The object may be, for example, a synthetic object generated using a computer image rendering package such as, for example, Renderman™ by Pixar™. At step 303, the object is sampled in the environment to generate a predetermined number of base images. Base images are preferably synthetic, or computer generated images but may also be digitized real world images such as film based photographs. Alternatively, the object may be sampled alone, exclusive of the environment to generate a predetermined number of base images. These base images may be stored in memory for subsequent reference. During sampling of an object in an environment, such things as viewing perspective, or lighting position may be changed to provide a representation of the object or environment under such conditions. Similarly, during the sampling of the object in an environment, other parameters may also be changed/modified/varied, including, but not limited to, the geometry of the object; the surface properties of objects or surfaces within a scene as well as properties of the lighting within the scene, such as color and brightness. Other parameters may include time or temperature. During the sampling process the scene or objects within the scene may be sampled so as to provide time-lapse effects. Each of these various views, perspectives, lighting angles and other lighting properties may be represented by a base image (object base image or environment base image) that may be stored to memory. A direction-dependent texture map is created based upon the base images derived from sampling the object in the environment, at step 305. At step 307, the scene is rendered based upon the direction-dependent texture map created from the base images derived from sampling of an object. This object may be sampled alone or in a predetermined environment.

While rendering a scene any of the parameters represented by the base images may be changed or varied to allow for near instantaneous reflection of the changed parameters in the scene being rendered.

By limiting the number of base images to some predetermined number it is possible to achieve a balance between realistic scene rendering (i.e. images which appear photo realistic) and relatively short times for carrying out such rendering and thus allow for fast preview of the scene under development. In one embodiment of the present invention, forty (40) object images are generated via sampling an object in an environment. Each base image represents the sampled object/environment with a particular parameter or set of parameters applied. The forty base images may be used to generate a direction-dependent texture map. Rendering of the scene is then carried out in accordance with the direction-dependent generated texture map generated on the predetermined set of base images.

In general, the greater the quality that is desired during preview of a scene, the more base images that will be needed. However, as the number of base images increases, the greater the computational resources that are required to generate direction-dependent texture maps and render the scene for preview in real-time. By determining the level of desired image quality during preview and the capacity of available system computational resources, an optimum number of base images can be determined that will give the desired quality level and allow for previewing in real-time without undue burden on the available computational system resources.

Figure 5:
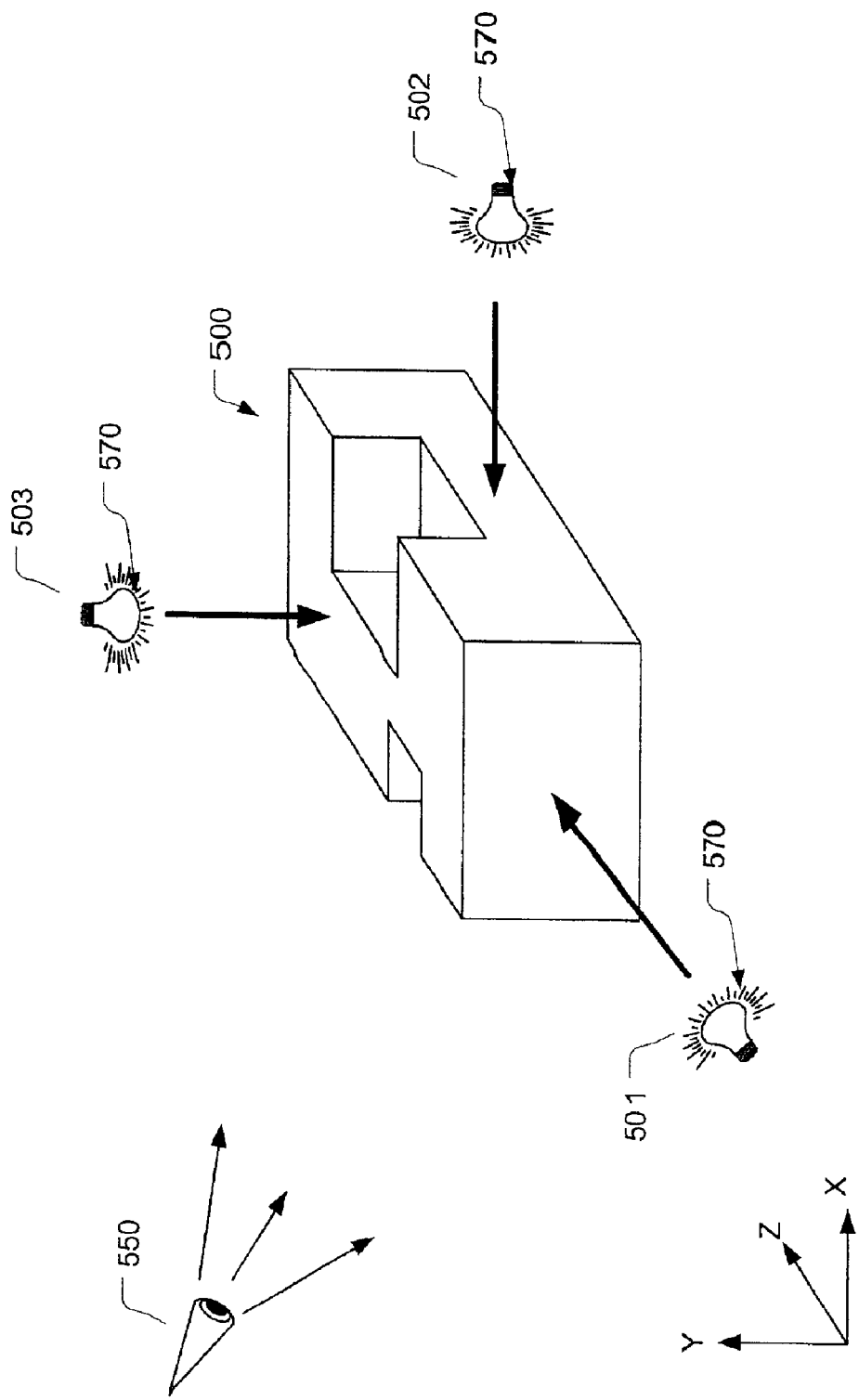
FIG. 5 is a diagram illustrating sampling of an object from a fixed perspective but with varying lighting angles to generate base images.

FIG. 4A–FIG. 4D illustrates an example of how an object 400 may be sampled from different perspectives 401, 402 and 403 to generate base images 410, 420 and 430. Sampling may be carried out via identifying an existing view or perspective of a computer-generated image as a base image. Data representing such view could then be stored and used to generate an object texture map, for example. Further, sampling may be carried out via actually imaging an object (or environment) from a predetermined perspective to produce/generate a base image. Similarly, with reference to FIG. 5 a viewing perspective 550 may remain constant while the position, or apparent position, of an illumination source could be varied in relation to the object 500 to provide base images showing the object 500 under different lighting conditions. Here a lighting source 570 is alternately placed at, for example, three different positions 501, 502 and 503, while the object 500 is sampled from the fixed viewing perspective 550 to generate a series of object base images.

Figure 6:
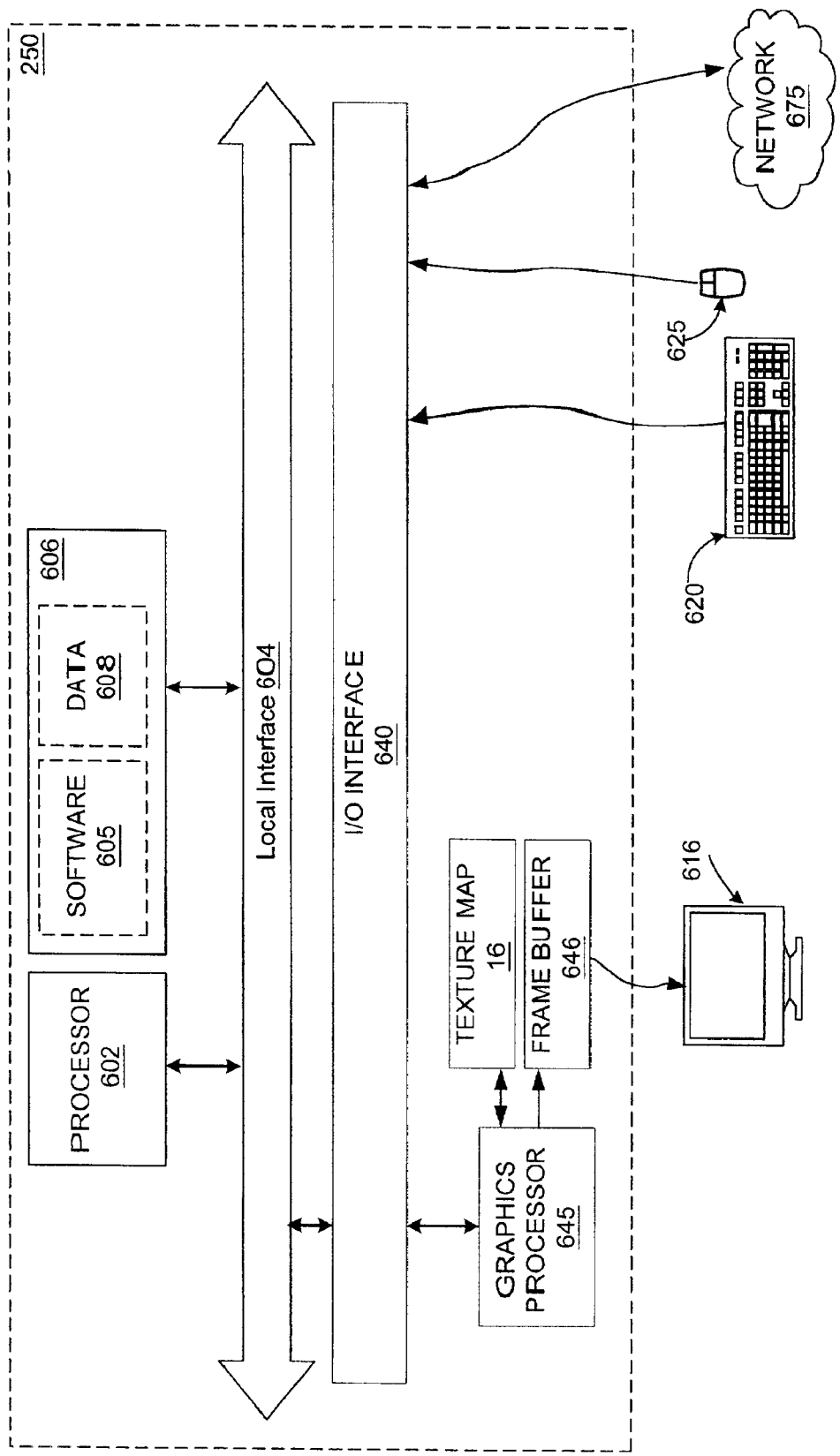
FIG. 6 is a diagram illustrating one embodiment of a system for rendering a scene according to the present invention.

FIG. 6 shows a block diagram of one embodiment of a scene rendering system 250 according to the present invention. It can be seen that there is provided a processor 602, a local interface bus 604, a memory 606 for storing electronic format instructions (software) 605 and data 608. Memory 606 can include both volatile and non-volatile memory. An input/output interface 640 may be provided for interfacing with and communicating data received from, for example, a network 675 or input devices such as a keyboard 620 and pointing device 625. Input/output interface 640 may also interface with, for example, graphics processor 645. Graphics processor 645 is provided for carrying out the processing of graphic information for display in accordance with instructions from processor 602.

Processor 602 may be configured to sample a scene and generate a predetermined number of environment base images and object base images in accordance with the methodology described above with respect to FIG. 3. These bases images may then be stored to memory 606. Processor 602 may also be configured to generate texture maps based upon the object base images and/or environment base images stored to memory 606. Processor 602 preferably generates these texture maps in accordance with the methodology described above with respect to FIG. 3. Processor 602 may be configured to carry out the above sampling and generation of base images, as well as texture maps, based upon software 605.

Graphics processor 645 may be configured to access relevant texture map data stored in texture map memory 16 (FIG. 1) as necessary and output processed graphics data to frame buffer 646 from which graphics data is output to a display device 616 for display. Processor 602 may be configured to control and grant access to data stored in memory 606 in accordance with the software 605 stored on memory 606. The software 605 may include, for example, a software rendering application or image generation application, or the like. Further, software 605 may include software instructions for performing the method of rendering a scene as discussed above with regard to FIG. 3.

Texture maps generated as a result of the method herein are preferably stored in texture map memory 16. Texture map memory 16 may be incorporated as a part of storage memory 606. Further, texture map memory 16 as well as memory 606 may be, for example, any type of computer-readable medium.

In an alternate embodiment of the present invention, a system and method for generating a scene for real-time display is provided. This system and method is discussed further below with respect to FIG. 7 and FIG. 8. With regard to this system, a predetermined scene composed of, for example, an environment and/or an object within the environment, may be represented by a predetermined number of base images. These base images may be stored on, for example, an associated computer-readable memory, such as an optical, magnetic or semiconductor based memory device. These base images may be generated as discussed above with regard to the process described in FIG. 3. These base images may be environment base images, representative of a particular environment under various conditions as defined by predetermined parameters. These bases images may also include object base images representative of a defined object within the environment. The scene represented by these base images may be, for example, a full motion computer-generated scene or a computer-generated still scene. This system and method could be used, for example, to generate and display in real-time, photorealistic, full-motion, computer-generated imagery in applications such as video games, environment simulation systems such as flight simulators, or graphical presentations.

Figure 7:
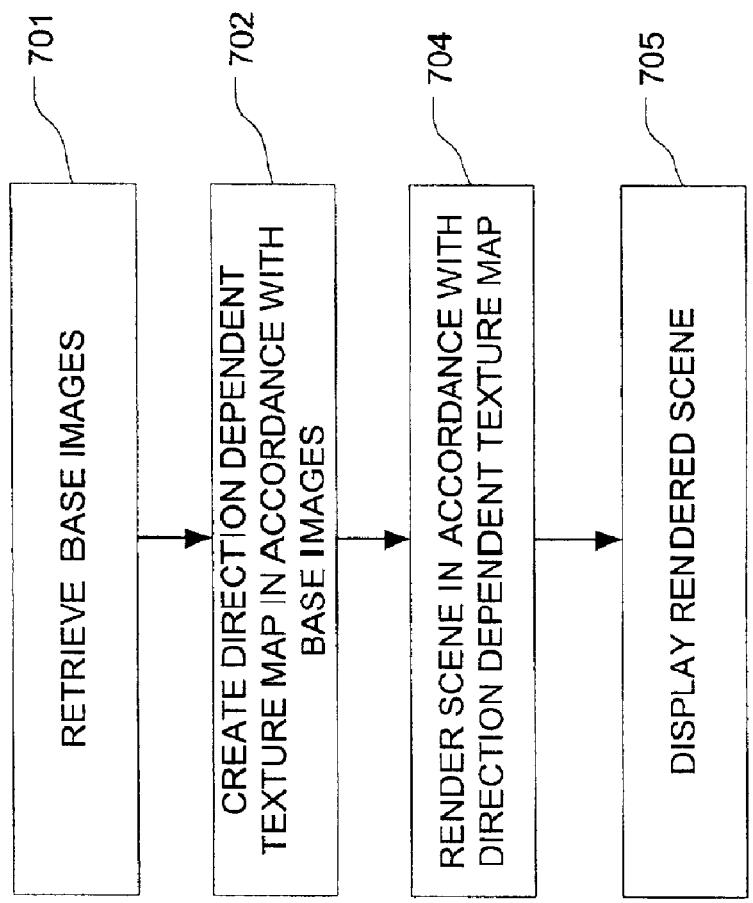
FIG. 7 is a flowchart illustrating a method of generating a scene for display based upon base image data.

FIG. 7 is a flowchart illustrating a method of generating a scene for display based upon base image data (object base image and/or environment base images) stored, for example, to a memory device. With reference to FIG. 7 it can be seen that data representing environment base images and/or object base images is retrieved from memory (701). Memory may be any type of computer-readable memory or storage device. A direction dependent texture map is generated in accordance with the environment base images (702). The direction dependent texture map may be stored to memory for future retrieval if desired. Based upon the direction dependent texture map, a scene is rendered which depicts an object associated with the retrieved base images (704). This rendered scene may be output for display on a display device (705).

In one embodiment, parameters represented by the base images may be changed during the process of rendering a scene for display. For example, where the base images represent an object as viewed under different lighting conditions, a user may choose to change from a scene in which lighting conditions are bright to a scene in which the same object or environment is represented under dark lighting conditions. By having various parameters represented by the base images, it is possible to change the displayed scene in real time.

Figure 8:
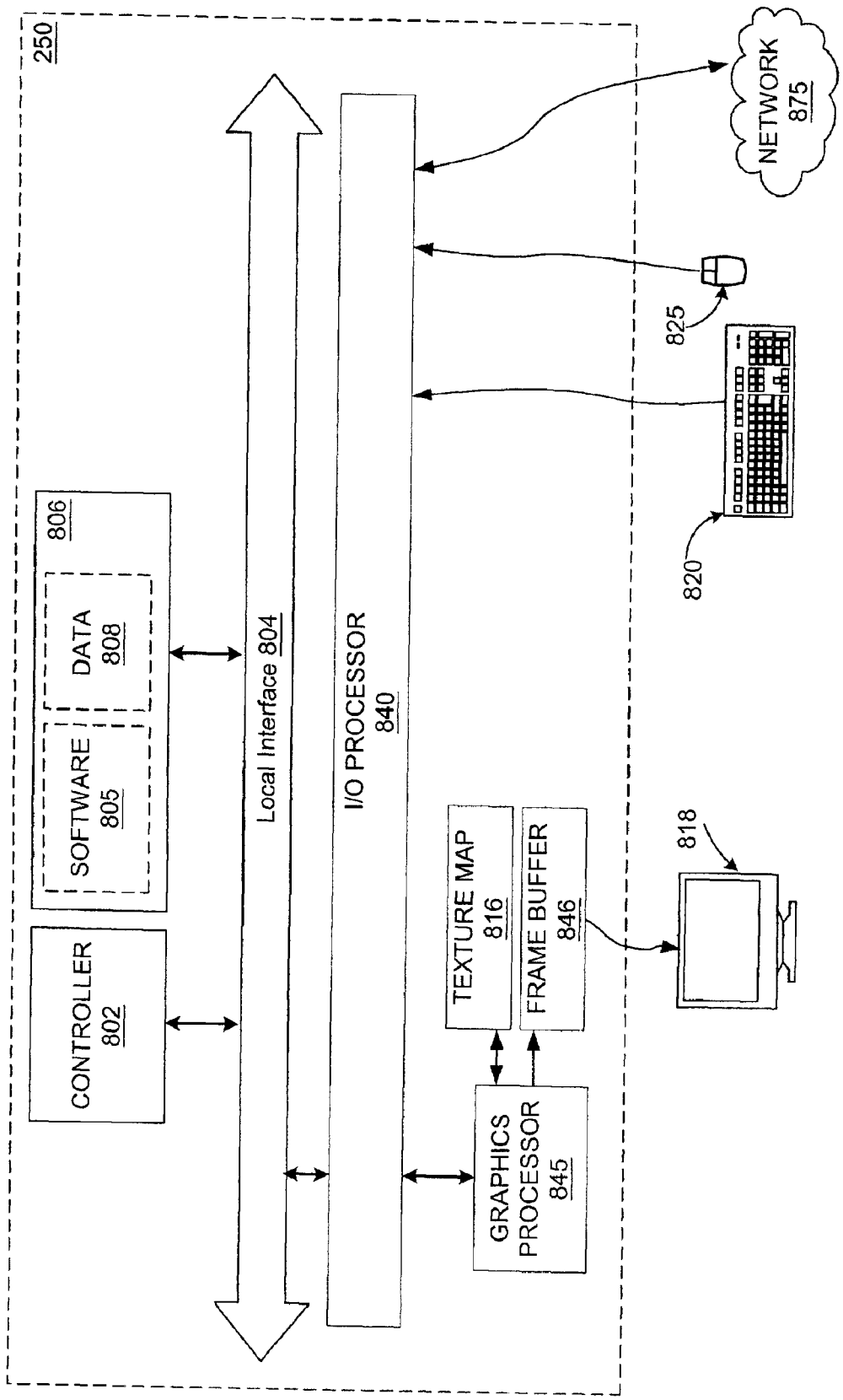
FIG. 8 is a diagram illustrating a system for generation of a scene for display according to the present invention.

FIG. 8 illustrates an embodiment of a system for generation of a scene in real-time for display according to the present invention. This system includes a processor 802, a local interface bus 804, a storage memory 806 for storing electronic format instructions (software) 805 and data 808. Storage memory 806 can include both volatile and non-volatile memory. An input/output interface 840 may be provided for interfacing with and communicating data received from, for example, a network 875 or input devices such as a keyboard 820 or pointing device 825. Input/output interface 840 may also interface with, for example, graphics processor 845. Graphics processor 845 may be provided for carrying out the processing of graphic information for display in accordance with instructions from processor 802. Graphics processor 845 may be configured to access relevant texture map data stored in, for example, texture map memory 816 as necessary and to output processed graphics data to frame buffer 846 from which graphics data representative of a scene is output to a display device 818 for display.

Processor 802 accesses data stored in memory 806 in accordance with, for example, software 805 stored on memory 806. Data stored in memory 806 may include base image data representative of a defined object under predetermined conditions. This base image data may also represent an object within an environment under predetermined conditions. It will be recognized that base image data may be stored on any memory device associated with and accessible by the processor 802. Memory 806 may be a fixed or a removable storage media. It may also be accessible via a network such as the Internet.

Processor 802 may be configured to generate texture maps based upon the base images stored as data 808 in memory 806, in accordance with software 805. These texture maps may then be stored to texture map memory 816. Processor 802 may also be configured to generate a scene for display in accordance with software 805 and the texture map data stored in texture map memory 816. The software 805 may include, for example, a presentation application, video game application or the like, configured to cause a scene to be generated for display according to the methodology set out in FIG. 7.

In a further embodiment of this system, processor 802 may be configured to generate the object base images and environment base images in accordance with the methodology described above with respect to FIG. 3. These object base images and/or environment base images may be stored, for example, as data 808 in memory 806 once they have been generated by processor 802.

It should be noted that texture map memory 816 may be incorporated as a part of memory 806. Memory 816 as well as memory 806 may be, for example, any type of computer-readable medium. Memory 806 may include a single type of memory storage or multiple types of memory storage, including, but not limited to, semiconductor storage memory, magnetic storage memory, magnetic disk memory, optical disk memory and magnetic/optical disk memory and combinations thereof.

The foregoing detailed description of the present invention is provided for the purposes of illustration and is not intended to be exhaustive or to limit the invention to the precise embodiment disclosed. Accordingly, the scope of the present invention is defined by the appended claims.

Any process descriptions or blocks ill flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The software 605 (FIG. 6), as well as software 805 (FIG. 8), comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of previewing a photo-realistic scene in real-time comprising the steps of:

defining a synthetic object;

rendering said synthetic object offline using an image synthesis tool to generate representations of said synthetic object in accordance with a set of predetermined parameters;

sampling said representations to generate a plurality of base images;

creating a direction-dependent texture map based on said plurality of base images; and rendering said synthetic object in said scene in real-time in accordance with said direction-dependent texture map.

2. The method of claim 1, wherein said step of rendering said synthetic object offline to generate representations of said synthetic object comprises rendering said synthetic object in an environment.

3. The method of claim 2, wherein rendering said synthetic object in an environment comprises modifying the orientation of said synthetic object with respect to the environment.

4. The method of claim 1, wherein said step of sampling said representations comprises capturing a digitized version of each representation of said synthetic object.

5. The method of claim 1, wherein said step of sampling said representations comprises recording a plurality of image parameters associated with picture elements.

6. The method of claim 1, wherein said predetermined parameters comprise an angle of a lighting source relative to said synthetic object.

7. The method of claim 1, wherein said predetermined parameters comprise an angle of viewing said synthetic object.

8. The method of claim 6, wherein said lighting source comprises an apparent lighting source.

9. A system for previewing a scene in real-time comprising:
an object generator configured to create rendered representations of a synthetic object associated with said scene, said synthetic object created using an image synthesis tool;
an image sampler configured to generate base images responsive to said representations in accordance with predetermined parameters;
a storage device for storing said base images;
a controller configured to generate a direction-dependent texture map in accordance with said base images; and
a rendering unit for rendering said scene in real time in accordance with said direction-dependent texture map.

10. The system of claim 9, wherein said rendering unit comprises a graphics processor.

11. The system of claim 9, wherein said base image represents said synthetic object.

12. The system of claim 9, wherein said base images represent said synthetic object within an environment.

13. The system of claim 9, wherein said base images are generated via a digital representation.

14. The system of claim 9, wherein said base images are responsive to at least one of an environmental parameter and an object parameter.

15. A system for previewing a scene in real-time comprising:
image synthesis tool for creating a synthetic object;
base image generator for sampling a rendered representation of said synthetic object and generating a plurality of base images;
texture map generator for generating a direction-dependent texture map in accordance with said plurality of base images;
storage device for storing said direction-dependent texture map; and
rendering unit for rendering said scene in real-time in accordance with said direction-dependent texture map.

16. The system of claim 15, wherein said rendering unit is further configured to output a signal representative of said rendered scene for real-time display.

17. The system of claim 16, further comprising a display device for previewing said rendered scene.

18. The system of claim 15, wherein said rendering unit comprises a graphics processor.

19. The system of claim 15, wherein said base image is responsive to at least one parameter selected from an environmental parameter and an object parameter.

20. The system of claim 19, wherein said environmental parameter comprises a view perspective.

21. The system of claim 19, wherein said environmental parameter comprises a light source position.

22. The system of claim 19, wherein said environmental parameter comprises time.

23. The system of claim 19, wherein said object parameter comprises a surface property associated with said synthetic object.

24. The system of claim 19, wherein said object parameter comprises a relative geometry of said synthetic object with respect to said environment.

* * * * *